United States Patent
Miller et al.

(10) Patent No.: US 8,755,507 B2
(45) Date of Patent: Jun. 17, 2014

(54) PROVIDING MULTILEVEL CONFERENCE CALL PARTICIPANTS

(75) Inventors: Steven M. Miller, Cary, NC (US); Jana H. Jenkins, Raleigh, NC (US); Lloyd W. Allen, Jr., Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 948 days.

(21) Appl. No.: 12/360,212

(22) Filed: Jan. 27, 2009

(65) Prior Publication Data
US 2010/0189241 A1    Jul. 29, 2010

(51) Int. Cl.
*H04M 3/42* (2006.01)
*H04W 4/00* (2009.01)

(52) U.S. Cl.
USPC ..................... 379/202.01; 455/416

(58) Field of Classification Search
USPC .............. 379/202.01; 455/415–416
See application file for complete search history.

(56) References Cited

U.S. PATENT DOCUMENTS 7,277,697 B2 * 10/2007 Desai et al. .............. 455/416
2010/0165889 A1 * 7/2010 Madabhushi et al. ....... 370/261

* cited by examiner

*Primary Examiner* — Rasha Al Aubaidi
(74) *Attorney, Agent, or Firm* — Esther F. Queen; Moore & Van Allen PLLC

(57) ABSTRACT

Providing multilevel teleconference call participants that may include receiving a request from a person to join a teleconference call, identifying a defined level of the person, and providing a notification regarding a status of persons having certain defined levels that one of have joined the teleconference call and have not joined the teleconference call. Further, a processing device may include a network interface, at least one second interface configured to establish a connection between at least two telephones, and a processor configured to receive a request from a person to join a conference call, identify a defined level of the person, and provide a notification regarding a status of persons having certain defined levels that have joined the teleconference call or have not joined the teleconference call.

19 Claims, 4 Drawing Sheets

PROVIDING MULTILEVEL CONFERENCE CALL PARTICIPANTS

The present application is related to the following applications that each have the same inventors and assignee and where the serial number is not yet known: "Contacting A Person Outside of a Teleconference Without Leaving the Teleconference", Ser. No. 12/360,189; "Accessing Details of Teleconference Call Invitees", Ser. No. 12/360,173; "Enhanced Announcement of Conference Call Participants", Ser. No. 12/360,251; "Rules-Based Teleconferencing", Ser. No. 12/360,237.

BACKGROUND OF THE INVENTION

The present invention is related to conference calls, and more specifically to providing multilevel conference call participants.

Conference calls, or multi-party calls provided though a conference bridge service have become a common method of conducting business meetings. Invited parties are given an access telephone number and usually a passcode or passphrase to authenticate to the call service and be joined into the conference. Passcodes may not always be required, permitting unauthenticated access to the conference. One passcode may exist for the meeting leader or moderator and another passcode for meeting participants, and thus a shared access code. In addition, each party may have a unique access code, providing higher security and better means of distinguishing or identifying calling parties. As an option in a conference, the meeting moderator may choose to have conference callers be held in a "waiting room" or an inactive state while waiting for the leader to activate or begin the conference call.

BRIEF SUMMARY OF THE INVENTION

According to one aspect of the present invention, a method for providing multilevel teleconference call participants includes receiving a request from a person to join a teleconference call, identifying a defined level of the person, and providing a notification regarding a status of persons having certain defined levels that one of have joined the teleconference call and have not joined the teleconference call.

According to another aspect of the present invention, a processing device includes a network interface, at least one second interface configured to establish a connection between at least two telephones, and a processor configured to receive a request from a person to join a conference call, identify a defined level of the person, and provide a notification regarding a status of persons having certain defined levels that one of have joined the teleconference call and have not joined the teleconference call.

According to a further aspect of the present invention, a computer program product comprising a computer useable medium having computer useable program code embodied therewith, the computer useable program code comprising computer useable program code configured to receive a request from a person to join a conference call, computer useable program code configured to identify a defined level of the person, and computer useable program code configured to provide a notification regarding a status of persons having certain defined levels that one of have joined the teleconference call and have not joined the teleconference call.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF THE INVENTION

Figure 1:
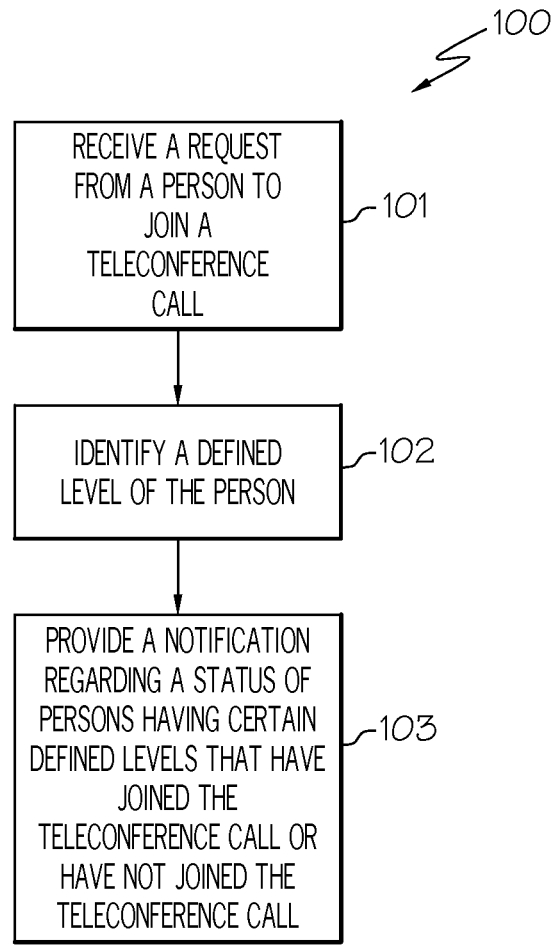
FIG. 1 is a flowchart of a process for providing multilevel teleconference call participants according to an exemplary embodiment of the present invention.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, platform, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the present invention, multiple levels of persons to a conference call may be defined. Some persons may be required or expected to attend, while others may be merely invited but neither expected nor required to attend. Additionally, there may be other persons or callers that either were not specifically invited by the conference leader, but were passed the conference details from another person. This last group may be allowed access with a shared passcode, or not be required to provide any authentication at all, either as unrequited and untracked participants or as guests tracked with a default guest passcode.

In embodiments according to the present invention, in order for a meeting to begin, the required participants may need to be active on the call, or the leader may need to decide to proceed without the missing participant (s). The teleconference call may remain in an inactive state while waiting parties are joined, but the meeting may not be considered started until all the required parties have joined.

A conference system according to embodiments of the present invention may provide a status, an announcement or a notification indicating which of the required persons or participants are missing, or indicating that all required participants are on the conference call, thus the meeting may proceed. The conference system may provide the status or a notification after each person/participant has joined the teleconference call. The conference call may optionally begin at any point, with the defined required/optional participants being announced only as an advisory aid to the meeting leader and participants, but not actually required in order to proceed with the conference call. The status, announcement or notification may occur at a specified time interval (e.g., every 2 minutes), a changing time interval (e.g., increasing after the start time passes), at the joining of any participants, or by explicit action or request from a meeting leader or one of the persons or participants. The following helps further illustrate an exemplary embodiment according to the present invention.

Example:
Meeting invitation: 11/30/2007 8:00-9:00 AM EST
Phone access: 800-555-1200
Subject: product discussion
Leader: Bob Jones, passcode=12345678
Required participants: Cindy Ames, passcode=543200
Tony Soluto, passcode=864219
Billy Biggs, passcode=644478
Optional participants: Troy Dunnit, passcode=0004444
Suzy Whosit, passcode=558833
Open access: passcode=222278
7:56: Cindy joins (call is inactive, "still waiting for Bob, Tony, Billy")
7:58: Bob joins (call is active, but "still waiting for Tony & Billy to join")
8:00: Troy joins (call is active, but "still waiting for Tony & Billy to join")
8:00: Billy joins (call is active, but "still waiting for Tony to join")
8:01: Ted joins using open access (call is active, but "still waiting for Tony to join")
8:02: Tony joins (call is active, "All participants have joined")
The conference may now begin.

FIG. 1 shows a flowchart of a process for providing multilevel teleconference call participants according to an exemplary embodiment of the present invention. In the process 100, in block 101, a request may be received from a person to join a teleconference call. In block 102, a defined level of the person requesting to join the teleconference call may be identified. In block 103, a notification may be provided regarding a status of persons having certain defined levels that have joined the teleconference call or that have not joined the teleconference call.

Figure 2:
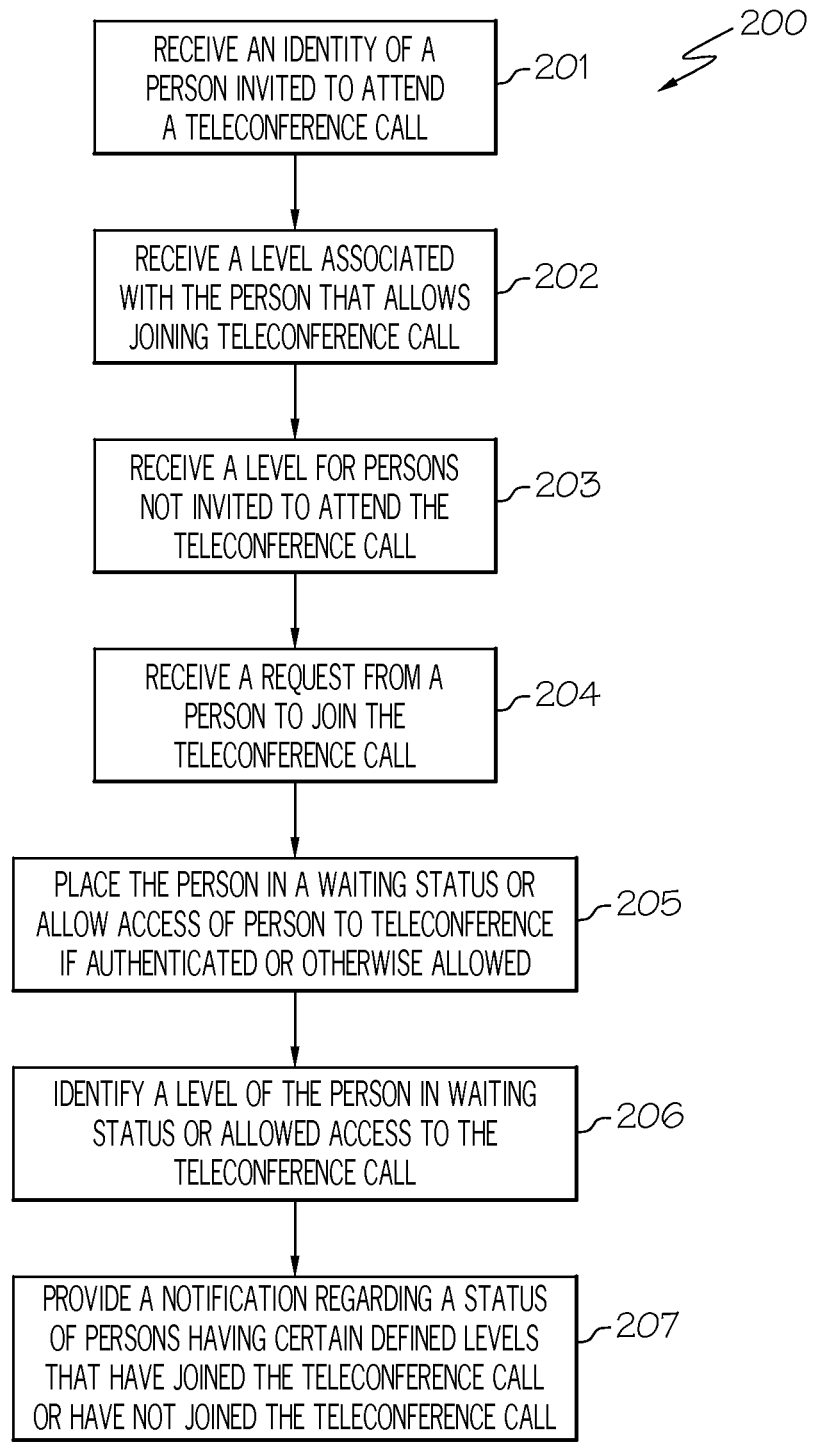
FIG. 2 is a flowchart of a process for providing multilevel teleconference call participants according to another exemplary embodiment of the present invention.

FIG. 2 shows a flowchart of a process for providing multilevel teleconference call participants according to another exemplary embodiment of the present invention. In the process 200, in block 201, an identity of a person invited to attend a teleconference call may be received. In block 202, a level associated with each person that allows joining the teleconference call may be received. The level may be a passcode that authorizes the person to be joined into the teleconference call. In block 203, a level for persons not invited to attend the teleconference call may be received. In block 204, a request from a person to join the teleconference call may be received. In block 205, the person may be placed into a waiting or hold status if the teleconference call is not active or joined in the teleconference if the teleconference call is active if the person is authenticated or otherwise allowed. For example, the teleconference call may be set up such that persons may be allowed to join the teleconference call with a valid passcode and/or may be allowed to join the teleconference call without any passcode. In block 206, a level of the person in waiting status or joined/allowed access to the teleconference call may be identified. In block 207, a notification may be provided regarding a status of persons having certain defined levels that have joined the teleconference call or that have not joined the teleconference call.

Figure 3:
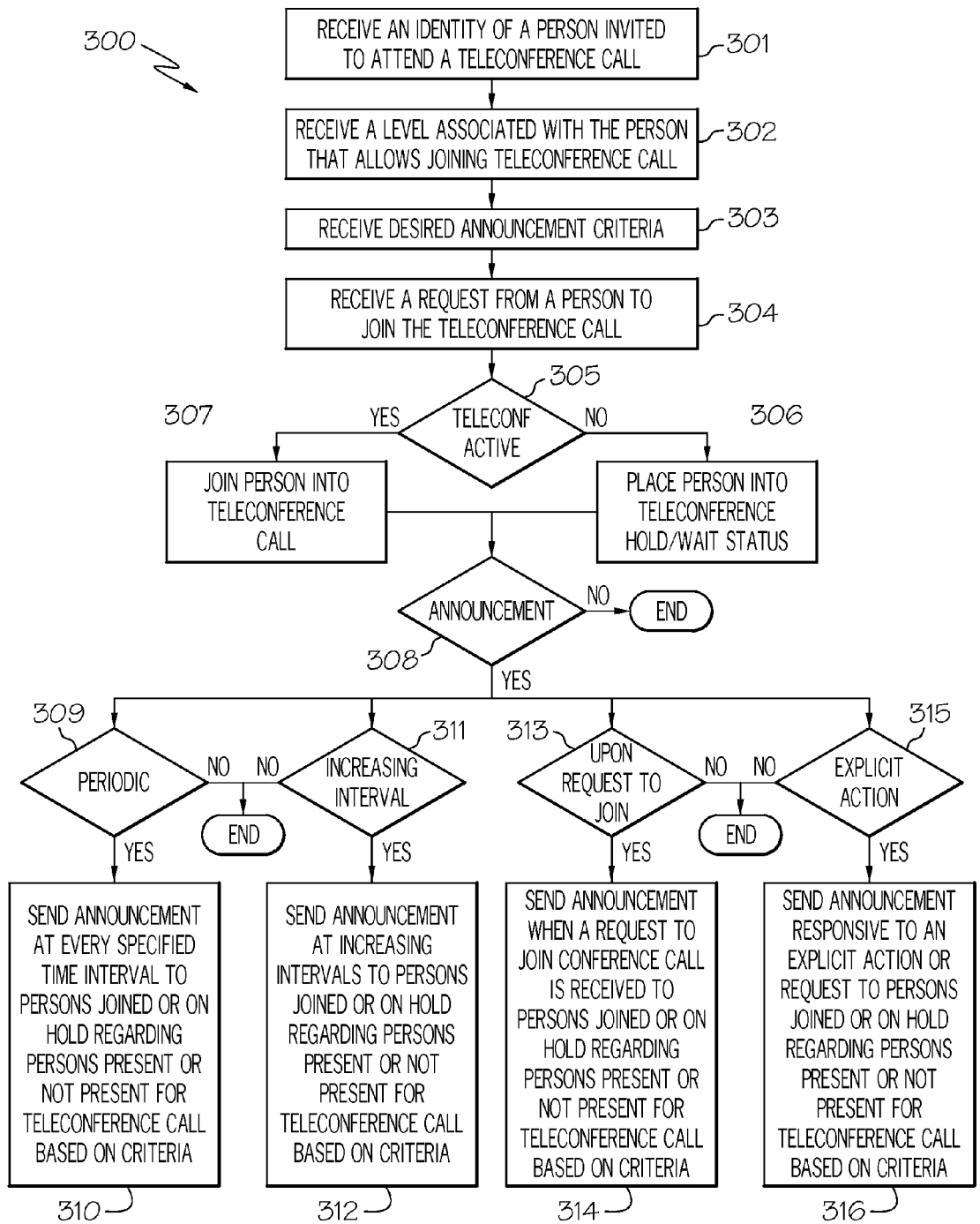
FIG. 3 is a flowchart of a process for providing multilevel teleconference call participants announcements according to an exemplary embodiment of the present invention.

FIG. 3 shows a flowchart of a process for providing multilevel teleconference call participant announcements according to an exemplary embodiment of the present invention. In the process 300, in block 301, an identity of a person invited to attend a teleconference call may be received. In block 302, a level associated with each person that allows joining the teleconference call may be received. The level may be a passcode that authorizes the person to be joined into the teleconference call. In block 303, desired announcement criteria may be received. A user, initiator or chair of the teleconference call may define and set up criteria regarding whether or not an announcement is made regarding persons that have joined or have not joined the teleconference call, and when and how announcements should be made. In block 304, a request may be received from a person to join the teleconference call.

In block 305, it may be determined if the teleconference is active and has been started with one or more joined persons, or whether the teleconference has not yet been started and is not active. If the teleconference is not active, then in block 306, the person may be placed into a hold or wait status. If the teleconference call is active then in block 307 the person may be joined into the teleconference call with any others already joined. In block 308 it may be determined based on the received criteria whether an announcement is to be made and if not, the process ends. If an announcement is to be made then the announcement may be generated and played in accordance with the criteria. For example, in block 309 it may be determined based on the criteria whether an announcement should be played periodically (e.g. every 2 minutes), and if not the process ends. If the announcement should be played periodically, then in block 310 an announcement may be generated and played at every specified time interval to persons joined or on hold regarding persons present or not present for the teleconference call.

Alternatively, in block 311, it may be determined based on the criteria whether an announcement should be played in increasing intervals (e.g., increasing frequency of announcements after the teleconference is active), and if not the process ends. If the announcement should be played in increasing intervals, then in block 312 an announcement may be generated and played at increasing intervals to persons joined or on hold regarding persons present or not present for the teleconference call.

Further, in block 313, it may be determined based on the criteria whether an announcement should be played after a request to join the teleconference call has been received and if not the process ends. If the announcement should be played after a request to join the teleconference call has been received, then in block 314 an announcement may be generated and played each time after a request to join the teleconference call has been received to persons joined or on hold regarding persons present or not present for the teleconference call.

In addition, in block 315, it may be determined based on the criteria whether an announcement should be played only when an explicit action or request has been made by a person such as, for example, an initiator of the teleconference call or originator of the teleconference call and if not the process ends. If the announcement should be played after a request to join the teleconference call has been received, then in block 316 an announcement may be generated and played when an explicit action or request has been made to persons joined or on hold regarding persons present or not present for the teleconference call.

Figure 4:
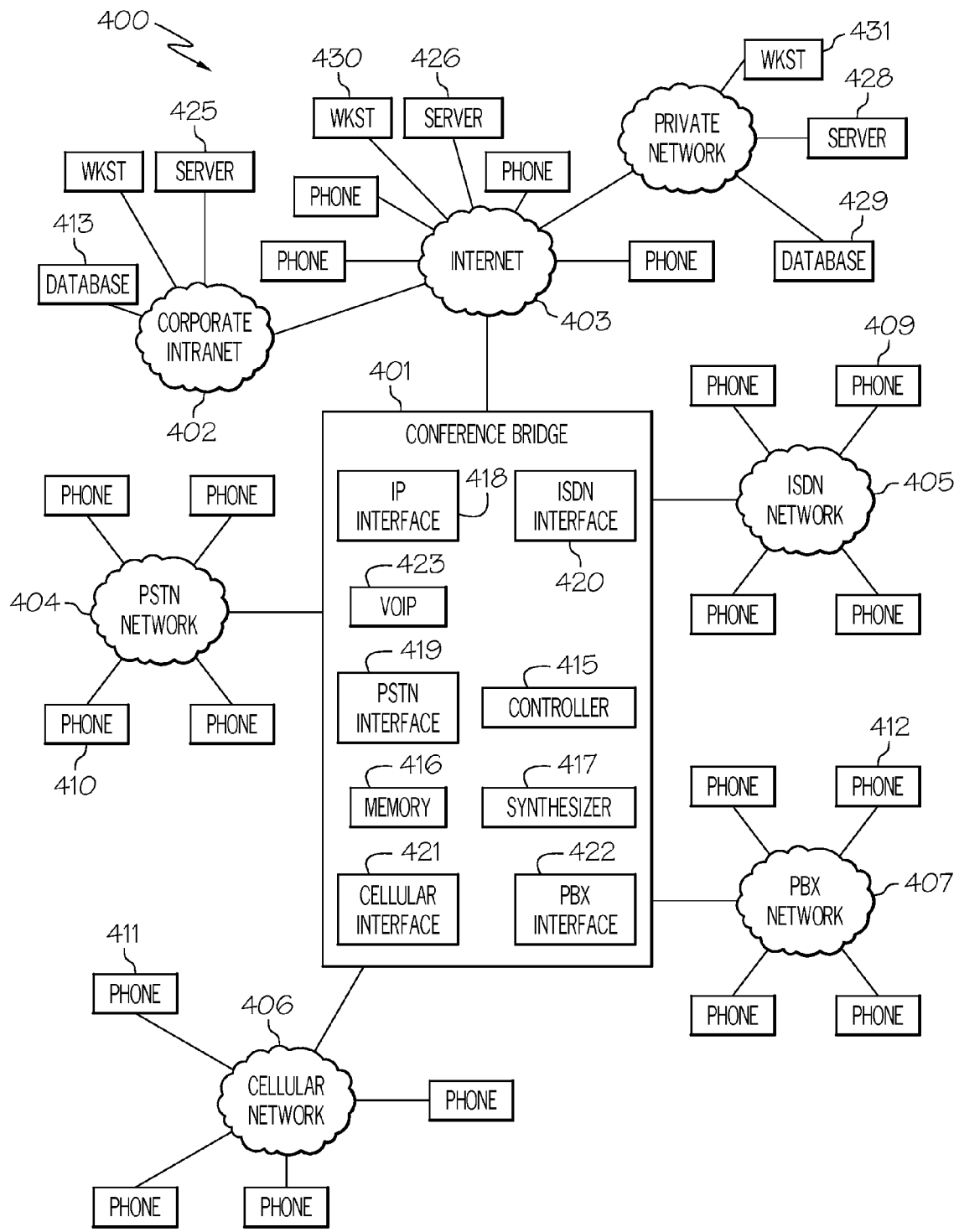
FIG. 4 is a diagram of a system for providing multilevel teleconference call participants according to an exemplary embodiment of the present invention.

FIG. 4 shows a diagram of a system for providing multi-level teleconference call participants according to an exemplary embodiment of the present invention. The system 400 may include a processing device 401 that may be interconnected to one or more networks or other resources. The processing device 401 may be a call system, a conference bridge, or any similar type device. To illustrate embodiments of the present invention the processing device 401 will be referred to as a call system. The call system 401 may be interconnected to the Internet 403 that may be interconnected to one or more telephones 408, a corporate Intranet 402 that may have access to a database 413 and a server 425, a public switched telephone network (PSTN) 404 that may be connected to one or more telephones 410, a cellular network 406 that may be interconnected to one or more telephones 411, a Private Branch Exchange (PBX) network 407 that may be interconnected to one or more telephones 412, an Integrated Services Digital Network (ISDN) 405 that may be interconnected to one or more telephones 409, etc. The Internet 403 may also allow connection to one or more servers 426, one or more workstations 430, and a private network 427 that may be connected to one or more servers 428, one or more workstations 431, and a database 429. The call system 401 may include an Internet Protocol (IP) interface 418, voice over IP (VOIP) processing 423, a PSTN interface 419, an ISDN interface 420, a cellular interface 421, a PBX interface 422, a synthesizer 417, memory 416, and a controller or processor 415 that controls processing and all of the interfaces.

The processor 415 in the call system 401 may set up a teleconference call with one or more telephones from any of the networks 402-407. Further, the call system 401 may allow a person to join a teleconference call, identify a level of the persons that has joined the teleconference call. The level of the person may relate to a passcode. A party may be allowed to join the teleconference call based on the call system receiving a valid passcode, or a party may be allowed to join the teleconference call without receiving a passcode.

The call system 401 may receive a request from a person to join a conference call, identify a defined level of the person, and provide a notification regarding a status of persons having certain defined levels that one of have joined the teleconference call and have not joined the teleconference call. The defined level may include a level for a teleconference call leader, a level for persons required to be in attendance at the teleconference call, a level for persons not required to be in attendance at the teleconference call, or a level for non-persons to the teleconference call. The defined level may be identified based on a passcode received from the person for joining the teleconference call. The notification in the teleconference call may include an announcement that all required persons have joined the teleconference call or an announcement that all required persons have not joined the teleconference call. The notification in the teleconference call may include an announcement of the names of all required persons that have joined the teleconference call, or names of required persons that have not joined the teleconference call.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for providing multilevel teleconference call participants comprising:
   receiving requests from plurality of people to join a teleconference call;
   identifying a first defined level of the plurality of people based on one or more unshared passcodes, wherein each of the one or more unshared passcodes is received from one person of the plurality of people, wherein the one person is required to be in attendance at the teleconference call;
   identifying a second defined level based on one or more shared passcodes received from at least one person of the plurality of people, wherein the at least one person is not required to be in attendance at the teleconference call, wherein the at least one person comprises a person invited to the teleconference call and a person not invited to the teleconference call;
   providing a notification regarding a status of persons having certain defined levels that one of have joined the teleconference call and have not joined the teleconference call; and
   increasing the frequency at which the notification is provided after the teleconference call is active.

2. The method according to claim 1, wherein the first defined level comprises a level for a teleconference call leader.

3. The method according to claim 1, wherein the notification in the teleconference call comprises one of an announcement that all required persons have joined the teleconference call and an announcement that all required persons have not joined the teleconference call.

4. The method according to claim 3, wherein the notification in the teleconference call comprises an announcement of the names of all required persons that have not joined the teleconference call.

5. The method according to claim 1, further comprising receiving an identification for each person invited to the teleconference call and receiving the defined level for each person prior to receiving the request from the person to join the teleconference call.

6. The method according to claim 1, further comprising providing the notification one of before the teleconference is active and after the teleconference call is active.

7. The method according to claim 1, further comprising providing the notification before the teleconference is active to persons that have been placed into a waiting status.

8. The method according to claim 1, further comprising providing the notification after the teleconference is active to persons that have joined the teleconference call.

9. The method according to claim 1, further comprising providing the notification when the person is joined in the teleconference call.

10. The method according to claim 1, further comprising providing the notification one of at a specific time interval and at a changing time interval.

11. The method according to claim 1, further comprising providing the notification responsive to a request from one of a person that is waiting to join the teleconference call and a person that has joined the teleconference call.

12. A processing device comprising:
   a network interface;
   at least one second interface configured to establish a connection between at least two telephones; and
   a processor configured to receive requests from a plurality of people to join a conference call, identify a first defined level of the plurality of people based on one or more unshared passcodes, wherein each of the one or more unshared passcodes is received from one person of the plurality of people, wherein the one person is required to be in attendance at the teleconference call, identify a second defined level based on one or more shared passcodes received from at least one person of the plurality of people, wherein the at least one person is not required to be in attendance at the teleconference call, wherein the at least one person comprises a person invited to the teleconference call and a person not invited to the teleconference call, provide a notification regarding a status of persons having certain defined levels that one of have joined the teleconference call and have not joined the teleconference call, and increase the frequency at which the notification is provided after the teleconference call is active.

13. The processing device according to claim 12, wherein the processing device comprises a conference bridge.

14. The processing device according to claim 12, wherein the at least one second interface comprises a private branch exchange (PBX) interface.

15. The processing device according to claim 12, wherein the at least one second interface comprises a public switched telephone network (PSTN) interface.

16. The processing device according to claim 12, wherein the at least one second interface comprises a wireless telephone network interface.

17. The processing device according to claim 12, wherein the at least one second interface comprises Voice over Internet Protocol (VoIP) interface.

18. A computer program product comprising a non-transitory computer useable medium having computer useable program code embodied therewith, the computer useable program code comprising:
   computer useable program code configured to receive requests from a plurality of people to join a conference call;
   computer useable program code configured to identify a first defined level of the plurality of people based on one or more unshared passcodes, wherein each of the one or more unshared passcodes is received from one person of the plurality of people, wherein the one persons is required to be in attendance at the teleconference call;

computer useable program code configured to indentify a second defined level based on one or more shared passcodes received from at least one person of the plurality of people, wherein the at least one person is not required to be in attendance at the teleconference call, wherein the at least one person comprises a person invited to the teleconference call and a person not invited to the teleconference call;

computer useable program code configured to provide a notification regarding a status of persons having certain defined levels that one of have joined the teleconference call and have not joined the teleconference call; and computer useable program code configured to increase the frequency at which the notification is provided after the teleconference call is active.

19. The computer program product according to claim 18, wherein the first defined level comprises a level for a teleconference call leader.

* * * * *